United States Patent Office 2,761,524
Patented Sept. 4, 1956

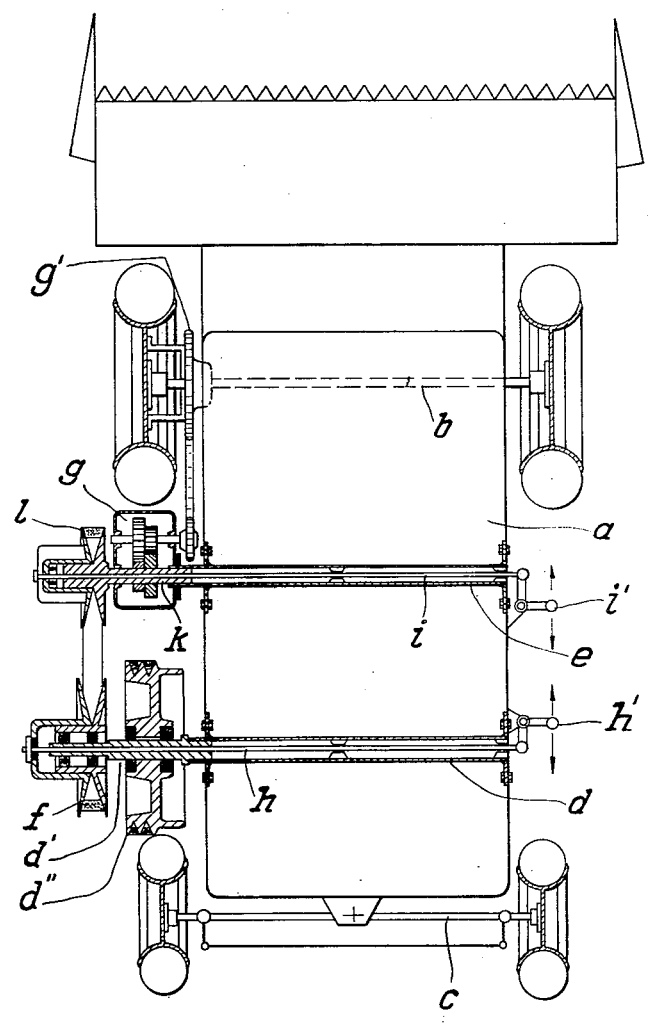

2,761,524
HARVESTER DRIVE TRANSMISSION AND CONTROL ARRANGEMENT

August Claas, Harsewinkel, Westphalia, Germany

Application January 14, 1954, Serial No. 404,000
Claims priority, application Germany January 17, 1953

3 Claims. (Cl. 180—70)

In the construction of agricultural machines such as harvester combines it is important to construct large bodies with the lowest possible weight and to make them stiff and extremely sturdy. For this purpose shells from self-supporting metal sheets have been successful which are provided with reenforcing tubes, mainly tubes extending transversely of the combine body.

The present invention provides a new, additional utilization of such reenforcing tubes, in combine shells and the like.

An object of the invention is to extend and open the transverse reenforcing tubes to the outside, whereby variable transmission pulleys can be mounted on the outer extensions of the tubes and control rods for such pulleys can be mounted within the tubes.

The invention will be best understood by reference to the accompanying drawing illustrating a combine harvester body in diagrammatic view seen from above.

In the drawing $a$ is the combine shell with the two axles $b$ and $c$ which carry the wheels. The left end of the reenforcing tube $d$, protruding from the shell, carries a stationary axle $d'$ and a drive pulley $d''$ thereon. Another protruding reenforcing tube $e$ is provided, to the end of which a gear box $g$ may be attached, actuating the axle $b$ through a sprocket and chain drive $g'$. The axle $d'$ also carries an adjustable pitch drive pulley or variable speed transmission member $f$, connectable with said main drive pulley $d''$ for instance by well-known clutch means, not shown.

Advantageously the variable speed transmission member $f$ is adjusted by a rod $h$ extending to it from the inside of the tube $d$. A similar rod $i$ is shown as extending through the tube $e$ to a split pulley $l$, driven from pulley $f$ and driving the gear unit $g$ through a revolving axle $k$, in alinement with the reenforcing or stiffening tube $e$. This axle $k$ is hollow; and the control rod $i$ operating the adjustable disc of the variable speed pulley $l$ extends through the hollow revolving axle.

The control members for the rods $h$ and $i$, shown as bell cranks $h'$, $i'$, can be mounted on the side of the combine $a$ opposite the pulleys $f$, $l$.

In this manner a very simple and efficient mounting for the variable drive elements is attained, while at the same time the shell of such combine harvesters becomes extremely sturdy. In addition, constructional advantages are attained; for example, various supporting constructions, control levers and mountings for the same, heretofore used in the art, can be dispensed with.

I claim:

1. An agricultural machine such as a harvester combine, comprising a body; drive means for the body; a tubular stiffener forming a transversely extending part of the body; hollow extension means coaxial with the tubular stiffener and extending therefrom beyond the body; a split pulley forming part of the drive means and supported laterally of the body upon the extension means; and a control rod for adjusting the split pulley, said rod extending through the tubular stiffener.

2. An agricultural machine as described in claim 1 wherein the extension means is stationary and rigidly connected with the tubular stiffener.

3. An agricultural machine as described in claim 1, additionally comprising a gear unit rigidly mounted on the tubular stiffener; the extension means being rotatably journaled in the tubular stiffener and in the gear unit.

References Cited in the file of this patent

UNITED STATES PATENTS

| | | |
|---|---|---|
| 679,076 | Johnston | July 23, 1901 |
| 1,279,547 | Hueber | Sept. 24, 1918 |
| 2,202,554 | Heyer et al. | May 28, 1940 |
| 2,543,319 | Heitshu | Feb. 27, 1951 |

FOREIGN PATENTS

| | | |
|---|---|---|
| 22,536 | Great Britain | 1912 |